(12) United States Patent
David et al.

(10) Patent No.: US 12,514,506 B2
(45) Date of Patent: Jan. 6, 2026

(54) APPARATUSES AND SYSTEMS FOR TRACKING BOWEL MOVEMENT AND URINATION AND METHODS OF USING SAME

(71) Applicant: Duke University, Durham, NC (US)

(72) Inventors: Lawrence David, Durham, NC (US); Stephen Embree, Durham, NC (US); Mohsin Haider, Durham, NC (US)

(73) Assignee: Duke University, Durham, NC (US)

( * ) Notice: Subject to any disclaimer, the term of this patent is extended or adjusted under 35 U.S.C. 154(b) by 887 days.

(21) Appl. No.: 17/761,352

(22) PCT Filed: Sep. 18, 2020

(86) PCT No.: PCT/US2020/051399
§ 371 (c)(1),
(2) Date: Mar. 17, 2022

(87) PCT Pub. No.: WO2021/055681
PCT Pub. Date: Mar. 25, 2021

(65) Prior Publication Data
US 2022/0346720 A1    Nov. 3, 2022

Related U.S. Application Data

(60) Provisional application No. 62/903,071, filed on Sep. 20, 2019.

(51) Int. Cl.
*A61B 5/00*        (2006.01)
*A47K 13/30*    (2006.01)
(Continued)

(52) U.S. Cl.
CPC ............ *A61B 5/6891* (2013.01); *A47K 13/30* (2013.01); *G01G 19/44* (2013.01); *G01G 19/52* (2013.01);
(Continued)

(58) Field of Classification Search
CPC .............................. A47K 13/30; A61B 5/6891
See application file for complete search history.

(56) References Cited

U.S. PATENT DOCUMENTS 7,194,776 B1 *   3/2007  Lastuka ................. E03D 13/00
                                                          340/603
2013/0110061 A1   5/2013  Abraham et al.
(Continued)

FOREIGN PATENT DOCUMENTS

CN        209252656        8/2019
WO    WO 2021/055681    3/2021

OTHER PUBLICATIONS

International Search Report and Written Opinion for PCT/US2020/051399. Mailed Dec. 8, 2020. 9 pages.

*Primary Examiner* — Lauren A Crane
(74) *Attorney, Agent, or Firm* — Casimir Jones, S.C.; Peter J. Schlueter

(57) ABSTRACT

The present disclosure provides devices, systems, and methods for the prognosis and management of diseases and conditions. In particular, the present disclosure provides devices, systems, and methods directed to a toilet apparatus for the automatic tracking of a subject's urination and bowel movements to enhance the diagnosis and treatment of various diseases and conditions.

19 Claims, 20 Drawing Sheets

(51) Int. Cl.
*G01G 19/44* (2006.01)
*G01G 19/52* (2006.01)
*G01S 13/86* (2006.01)

(52) U.S. Cl.
CPC ............... *A61B 2562/0252* (2013.01); *A61B 2562/0261* (2013.01); *A61B 2562/04* (2013.01); *G01S 13/86* (2013.01)

(56) References Cited

U.S. PATENT DOCUMENTS

| | | | |
|---|---|---|---|
| 2017/0328884 A1 | 11/2017 | Bezemer et al. | |
| 2018/0055488 A1* | 3/2018 | Hall | E03D 11/11 |
| 2018/0087969 A1* | 3/2018 | Hall | G01G 19/44 |
| 2018/0359987 A1 | 12/2018 | Kaneko | |
| 2020/0337509 A1* | 10/2020 | Ho | A47K 13/10 |

* cited by examiner

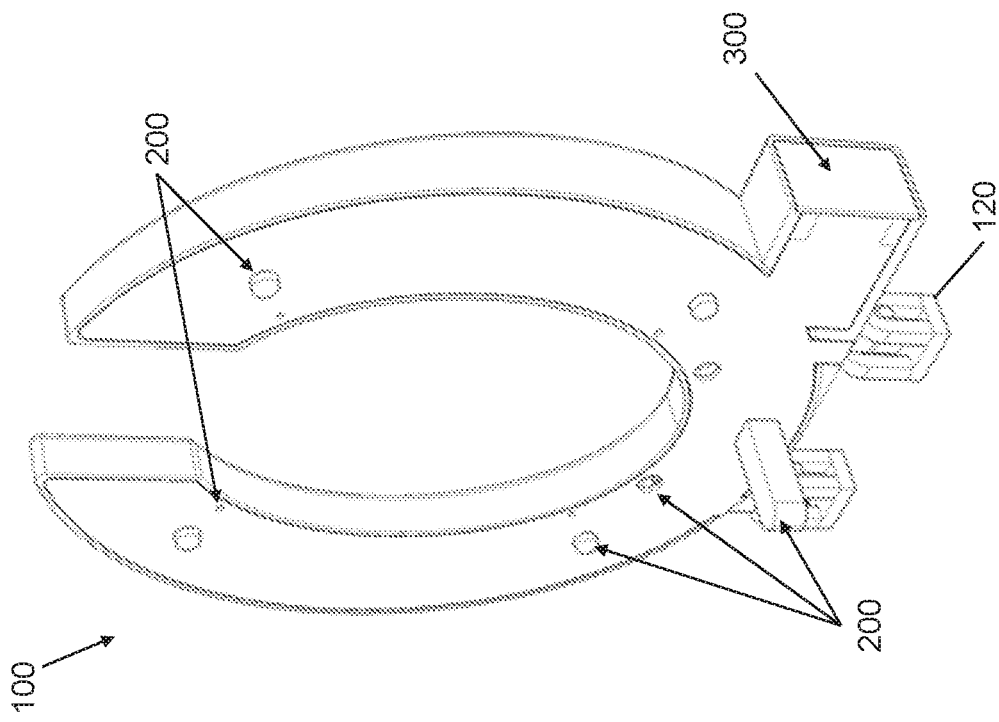
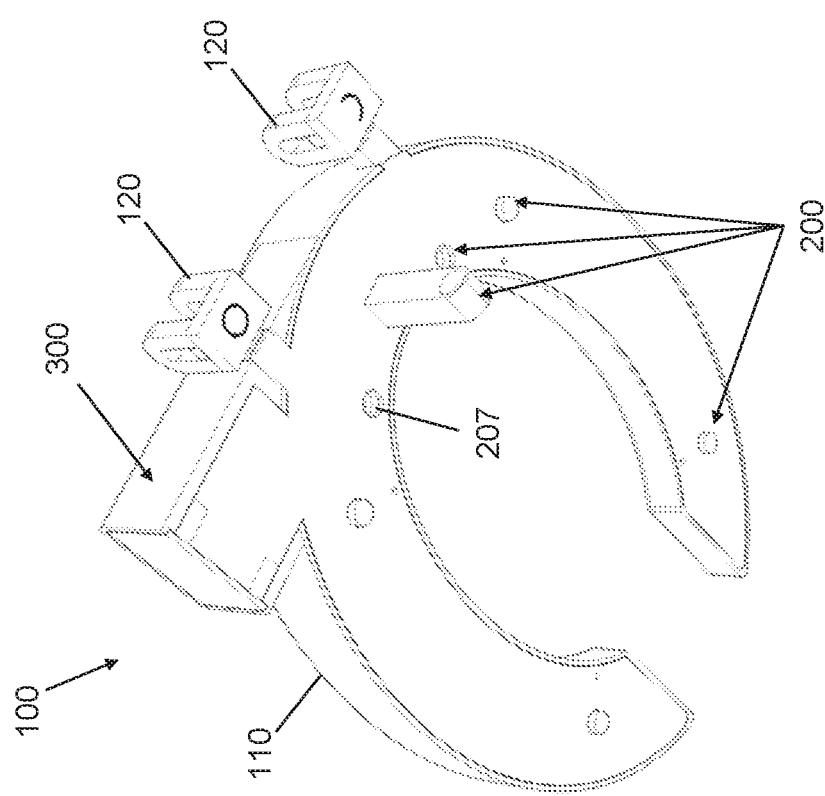

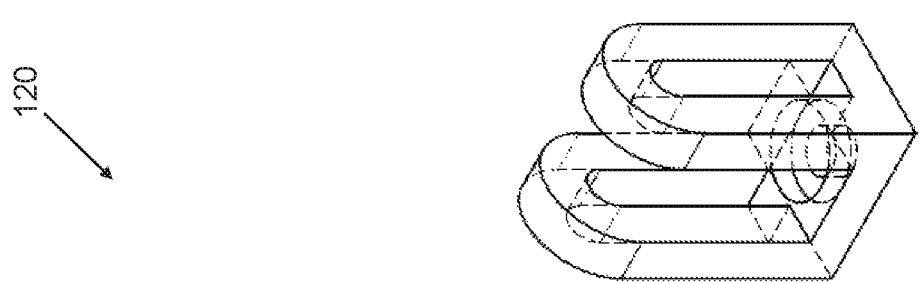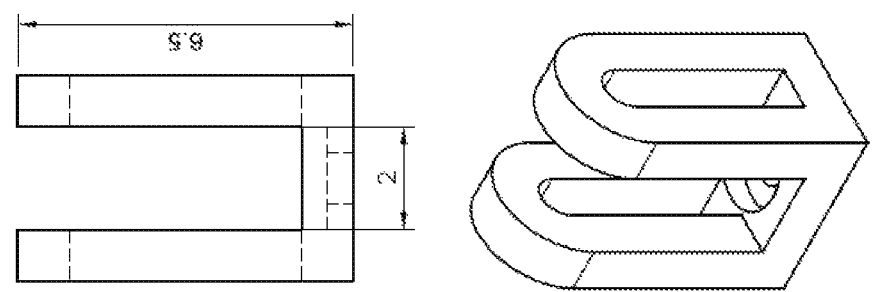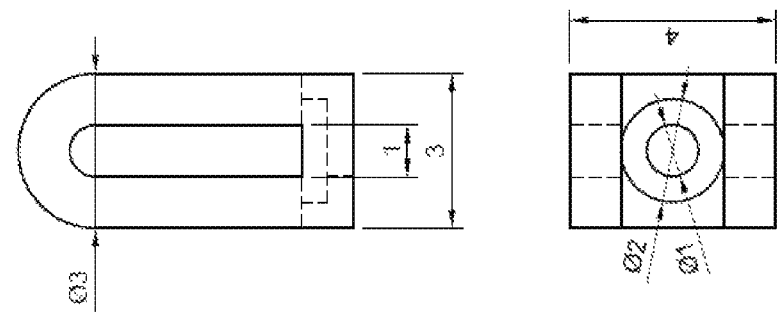
FIG. 5

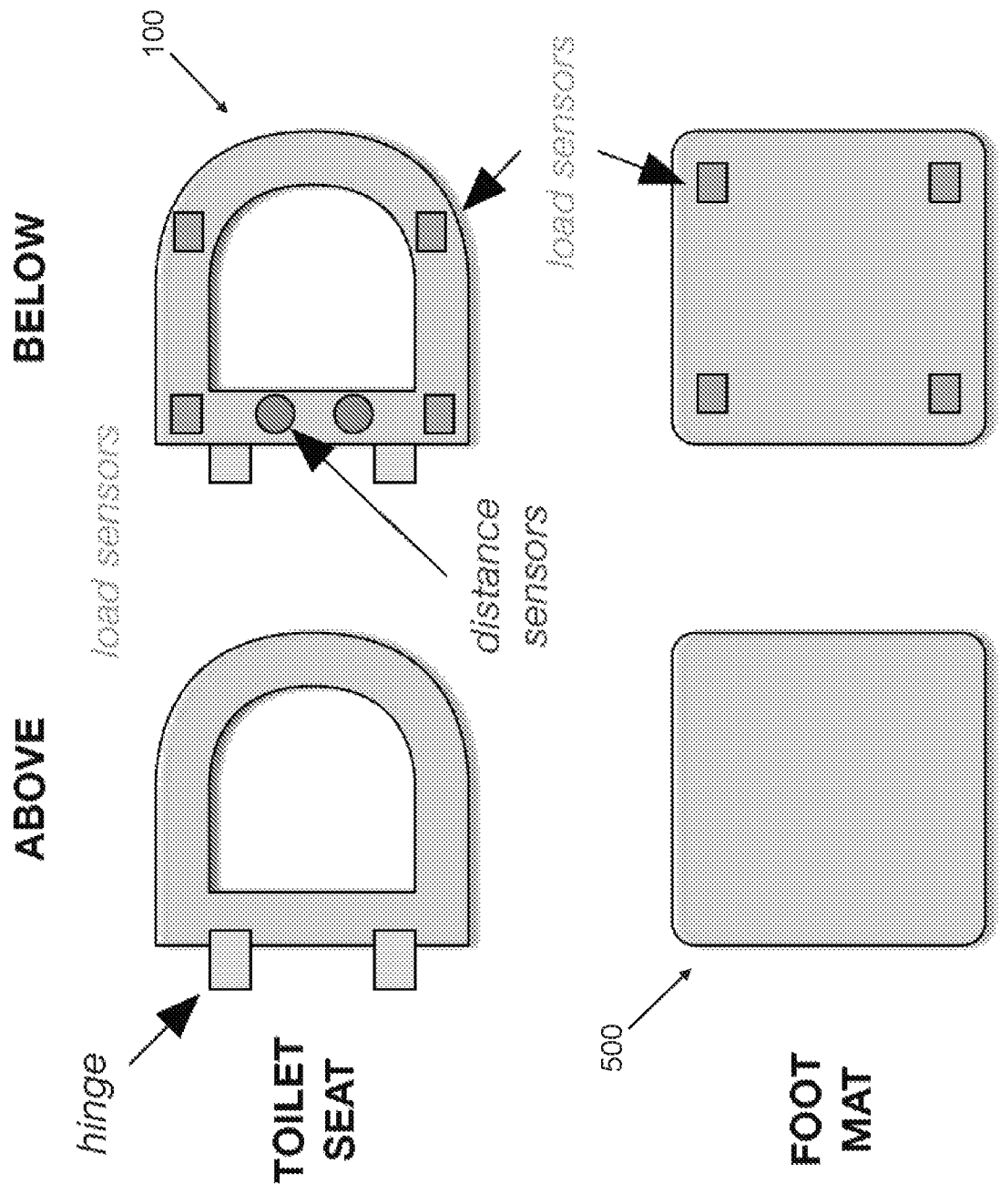

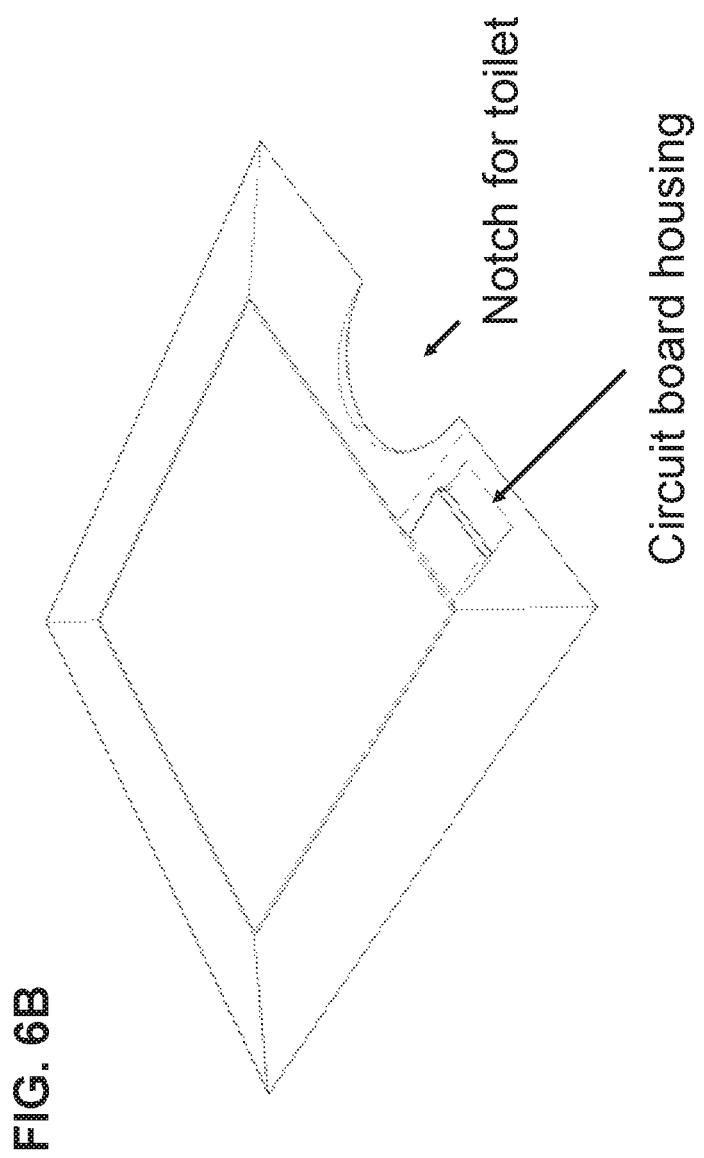

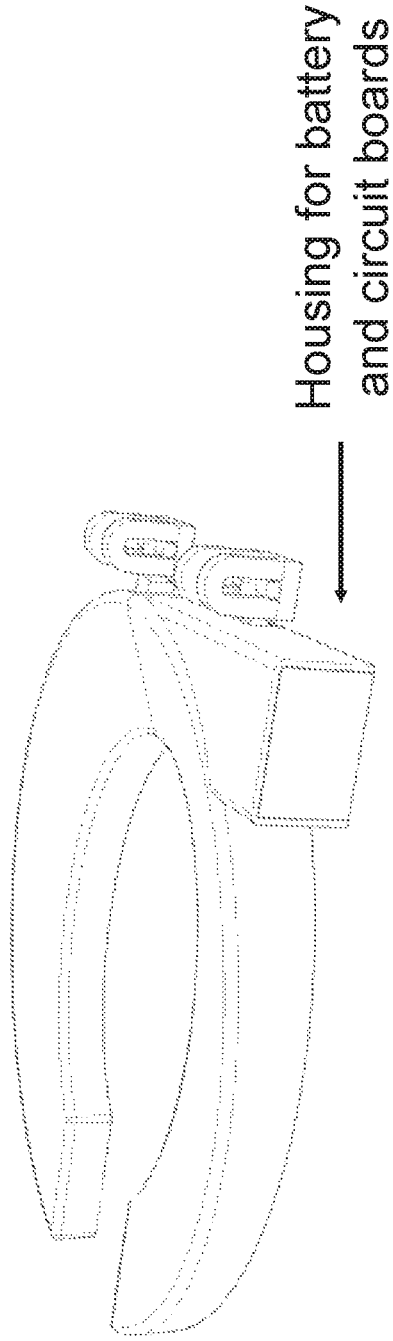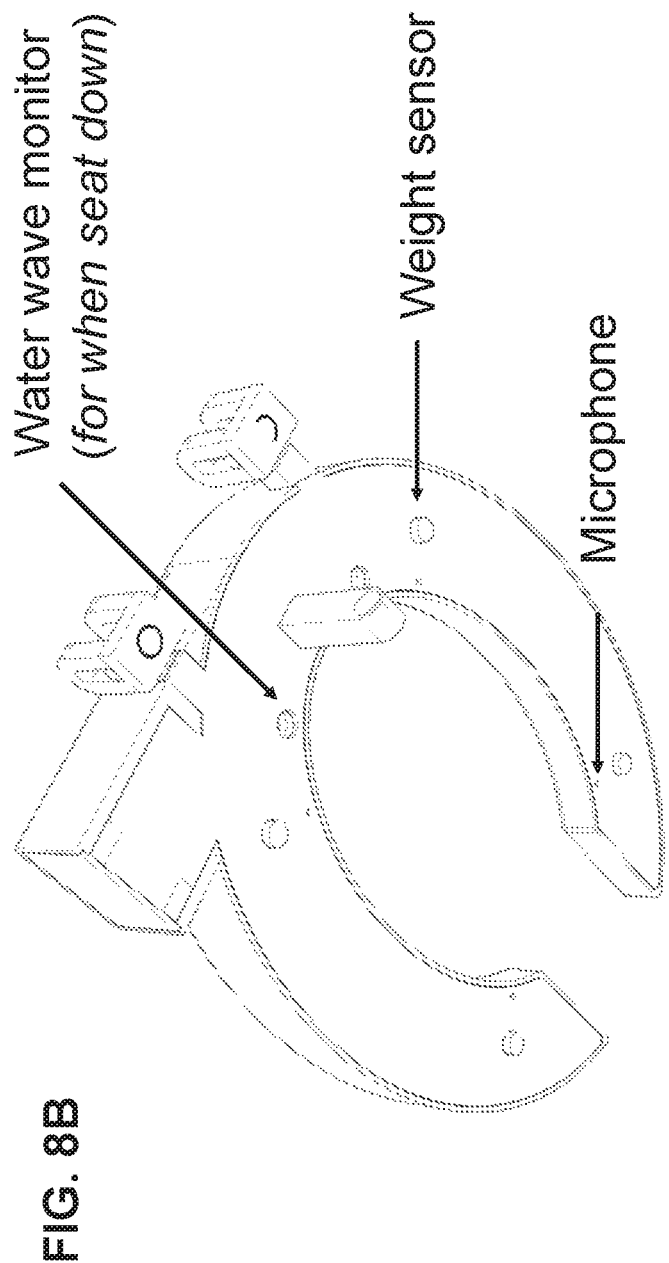
FIG. 8A
FIG. 8B

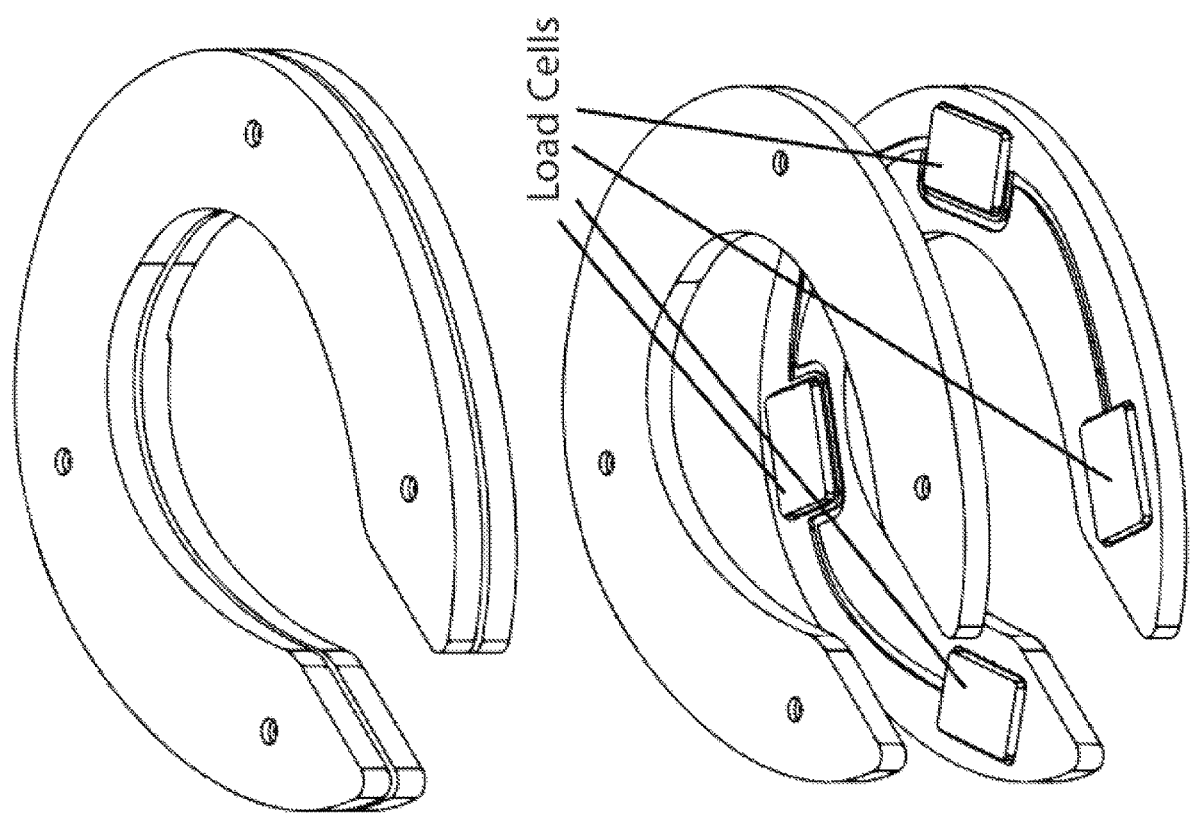

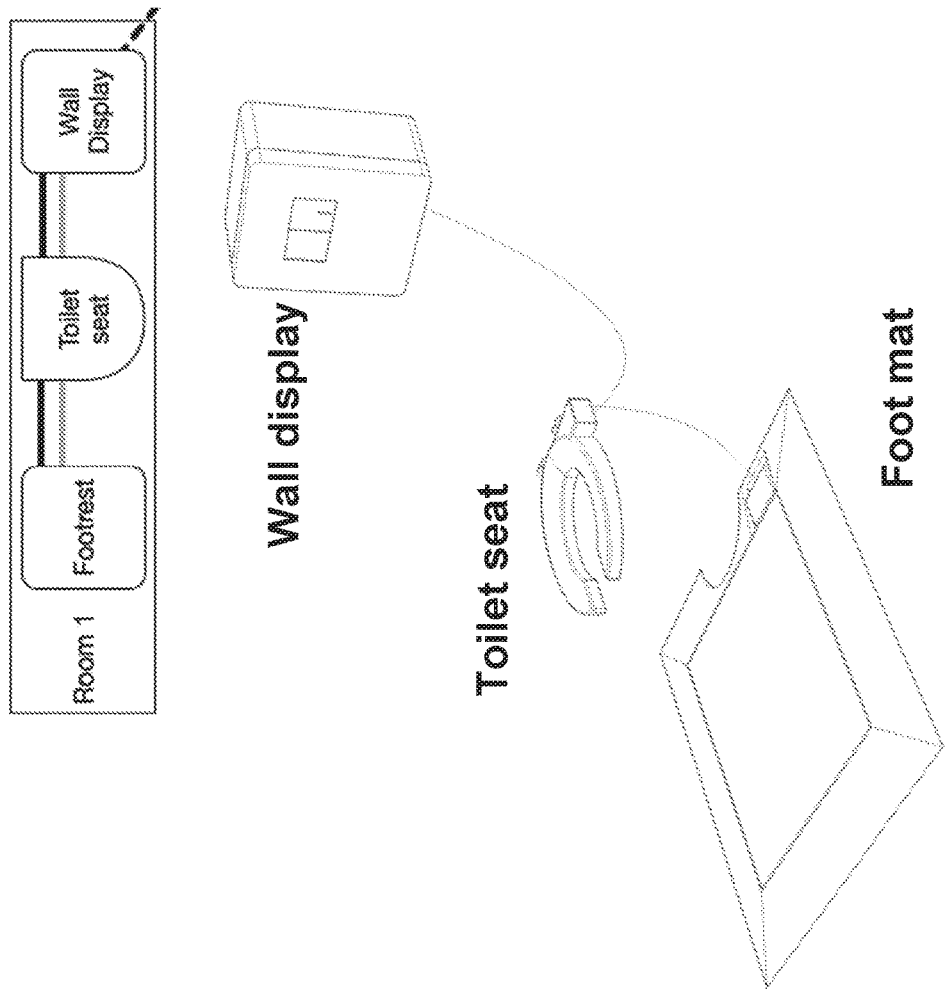
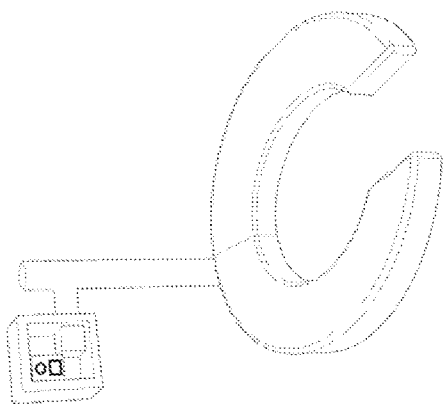
FIG. 16

APPARATUSES AND SYSTEMS FOR TRACKING BOWEL MOVEMENT AND URINATION AND METHODS OF USING SAME

RELATED APPLICATIONS

This application claims priority to and the benefit of U.S. Provisional Patent Application No. 62/903,071 filed Sep. 20, 2019, which is incorporated herein by reference in its entirety for all purposes.

FIELD

The present disclosure provides devices, systems, and methods for the prognosis and management of diseases and conditions. In particular, the present disclosure provides devices, systems, and methods directed to a toilet apparatus for the automatic tracking of a subject's urination and bowel movements to enhance the diagnosis and treatment of various diseases and conditions.

BACKGROUND

For the prognosis and management of various health conditions, it is useful to track the amount of urine and feces a subject passes for the management of various health conditions. However, accurate monitoring of such biological functions is difficult. While it is possible to track the sum of urine and feces using change in weight, the weight alone does not discriminate the relative amounts of urine and feces. The addition of feces to the bowl typically causes a rapid rise in the bowl liquid level or decrease in user weight. On the other hand, the addition of urine adds volume at a slower rate and decreases user weight at a slower rate. The variation in urine and feces complicates the ability to accurately and effectively treat and diagnose a subject. Therefore, means for rapidly and accurately discriminating bowel movements from urination for accurate quantification of these events is needed.

SUMMARY

Embodiments of the present disclosure include a toilet system. In accordance with these embodiments, the system includes a toilet seat apparatus comprising at least one radar sensor and at least one load cell, and a toilet controller comprising a communication system. In some embodiments, data output from the at least one radar sensor and data output from the at least one load cell discriminate a weight of urine from a weight of feces from a subject. In some embodiments, the controller is configured to receive the data output from the at least one radar and load cell and to transmit the data to an external device.

In some embodiments, the at least one load cell comprises a strain gauge.

In some embodiments, the at least one load cell comprises two or more load cells positioned on an underside surface of the toilet seat apparatus.

In some embodiments, the at toilet seat apparatus comprises a bifurcated toilet seat comprising an upper seat layer and a lower seat layer.

In some embodiments, the at least one load cell is positioned between the upper and lower layers of the bifurcated toilet apparatus.

In some embodiments, the at least one radar sensor comprises a focusing lens.

In some embodiments, the at least one radar sensor comprises two radar sensors, with a first radar sensor positioned horizontally to detect surface area of the feces from the subject, and with a second sensor positioned at a downward angle. This configuration allows for measurements including the surface area and velocity of the feces.

In some embodiments, the system further comprises one or more supplemental sensors. In some embodiments, the one or more supplemental sensors is selected from a group consisting of an ultrasound sensor, a laser sensor, an RGB light sensor, a spectrophotometer, a camera, a gas sensor, an acoustic sensor, and any combinations thereof.

In some embodiments, the toilet apparatus seat comprises at least one acoustic sensor positioned on an underside surface of the toilet seat apparatus.

In some embodiments, the system comprises two or more acoustic sensors. In some embodiments, a first acoustic sensor is positioned on an underside surface of the toilet seat apparatus, and a second acoustic sensor is positioned on a toilet bowl surface outside of the toilet bowl.

In some embodiments, the system further comprises a foot mat. In some embodiments, the foot mat comprises a plurality of load sensors configured to measure the weight of the subject, and the load sensors are in electronic communication with the toilet controller.

In some embodiments, the toilet controller is integrated into the toilet seat. In some embodiments, the toilet controller is separate from the toilet seat.

In some embodiments, the toilet controller comprises a wireless network. In some embodiments, the system further comprises a flushing controller in electronic communication with the toilet controller.

In some embodiments, the system further comprises a sensor configured to read a subject identification device.

Embodiments of the present disclosure also include a method of determining a stool and/or urine event from a subject using the any of the toilet systems described above. In accordance with these embodiments, the method includes detecting a subject's presence, initiating data collection using the toilet controller, and collecting elimination event data using the sensors in the toilet seat apparatus.

In some embodiments, the method further comprises analyzing the elimination event data using the toilet controller and/or transmitting the elimination data to an external device for analysis.

In some embodiments, the method further comprises executing an action dependent on the type of elimination event, wherein the action comprises signaling a flushing controller, signaling a remote operator, and/or saving the elimination data to an electronic record.

BRIEF DESCRIPTION OF THE DRAWINGS

FIGS. 1A-1B: FIG. 1A is a perspective view of a toilet seat apparatus according to one embodiment of the present disclosure. FIG. 1B is an alternative perspective view of the toilet seat apparatus depicted in FIG. 1A.

FIG. 5 is a perspective view of various hinges that can be used with the toilet seat apparatus, according to one embodiment of the present disclosure.

FIGS. 6A-6B: FIG. 6A is a schematic illustration of a seat and foot mat highlighting various sensors of the toilet seat apparatus, according to one embodiment of the present disclosure. FIG. 6B is a schematic illustration of a foot mat highlighting a circuit board housing and notch for integrating into a toilet, according to one embodiment of the present disclosure.

FIG. 7A is a schematic illustration of a toilet seat apparatus that includes a radar sensor for detecting water movements, according to one embodiment of the present disclosure. FIG. 7B is a schematic illustration of a toilet seat apparatus that includes a radar sensor for stool detecting and analysis, according to one embodiment of the present disclosure. FIG. 7C is a schematic illustration of a toilet seat apparatus that includes two radar sensors for stool detecting and analysis, according to one embodiment of the present disclosure. FIG. 7D is a schematic illustration of a toilet seat apparatus that includes two radar sensors for stool detecting and analysis that are mounted toward the back end of the apparatus, according to one embodiment of the present disclosure.

FIGS. 8A-8B: FIG. 8A is a perspective view of a toilet seat apparatus highlighting the housing for a power source and circuit boards, according to one embodiment of the present disclosure. FIG. 8B is a perspective view of a toilet seat apparatus highlighting the water wave sensor, weight sensor, and acoustic sensor, according to one embodiment of the present disclosure.

FIG. 9A is a representative picture of a toilet seat apparatus highlighting the acoustic sensors (e.g., microphones), load cells (e.g., strain gauges) and ultrasound sensors on the underside of the toilet seat, according to one embodiment of the present disclosure. FIG. 9B is a representative picture of a toilet system that includes the toilet seat apparatus and the foot mat, according to one embodiment of the present disclosure. FIG. 9C is a representative picture of a toilet seat apparatus highlighting the radar sensor and the bifurcated seat configuration, according to one embodiment of the present disclosure. FIG. 9D is a representative picture of a toilet seat apparatus highlighting a fiberglass cover, according to one embodiment of the present disclosure.

FIG. 10 is a schematic illustration of a bifurcated toilet seat with internal load cells, according to one embodiment of the present disclosure.

FIG. 16 is a schematic illustration of a single-room toilet system, according to one embodiment of the present disclosure.

DETAILED DESCRIPTION

Figure 2:
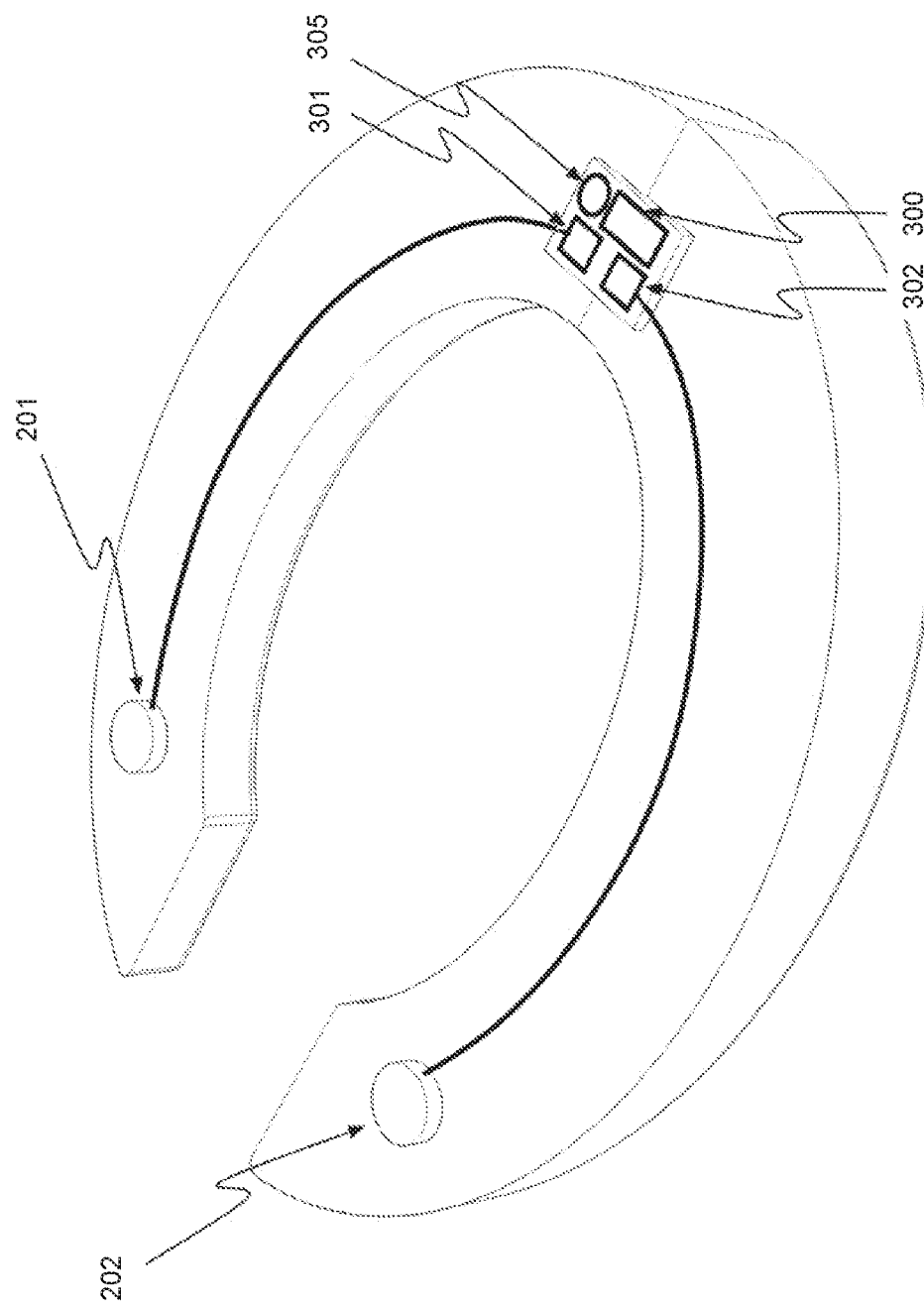
FIG. 2 is a perspective view of the toilet seat apparatus highlighting the control system, according to one embodiment of the present disclosure.

Section headings as used in this section and the entire disclosure herein are merely for organizational purposes and are not intended to be limiting.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Moreover, the present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Recitation of ranges of values herein are merely intended to serve as a shorthand method of referring individually to each separate value falling within the range, unless otherwise-Indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

As used herein, "treatment," "therapy" and/or "therapy regimen" refer to the clinical intervention made in response to a disease, disorder or physiological condition manifested by a patient or to which a patient may be susceptible. The aim of treatment includes the alleviation or prevention of symptoms, slowing or stopping the progression or worsening of a disease, disorder, or condition and/or the remission of the disease, disorder or condition.

The term "effective amount" or "therapeutically effective amount" refers to an amount sufficient to effect beneficial or desirable biological and/or clinical results.

As used herein, the term "subject" and "patient" are used interchangeably herein and refer to both human and nonhuman animals. The term "nonhuman animals" of the disclosure includes all vertebrates, e.g., mammals and non-mammals, such as nonhuman primates, sheep, dog, cat, horse, cow, chickens, amphibians, reptiles, and the like.

2. Toilet Seat Apparatus and Systems

Embodiments of the present disclosure include apparatuses, systems, and methods for the prognosis and management of diseases and conditions. In particular, the present disclosure provides devices, systems, and methods directed to a toilet apparatus for the automatic tracking of a subject's urination and bowel movements to enhance the diagnosis and treatment of various diseases and conditions. The present disclosure relates generally to toilet systems that can be used to collect information related to a subject's elimination events (e.g., diagnostic information) as well as to improve efficiency and convenience of toilet usage, both at home and in the setting of a care facility (e.g., hospital, clinic, nursing home, and the like). The toilet systems and toilet seat apparatuses disclosed herein are particularly useful in a therapeutic setting, such as a hospital or clinic, in which many different attributes of elimination are observed for a variety of treatment purposes. For example, information such as quantity, content, frequency, color, consistency, and the like, of feces and/or urine can be used to assist in making a determination regarding a subject's health or disease state, and/or in making a determination regarding a subject's recovery from medical treatment or procedure. These and other data can be collected in an automatic manner by the disclosed toilet system. Additionally, the toilet system can be customized for a particular subject that is using the system (e.g., with respect to the subject's individual characteristics and medical needs), and it is modular, so it can be designed to fit any standard toilet. The toilet systems and toilet seat apparatuses of the present disclosure facilitate methods and means for distinguishing urination from defecation with enhanced accuracy and efficacy than conventional.

Embodiments of the present disclosure include a toilet system. In accordance with these embodiments, the system includes a toilet seat apparatus comprising at least one radar sensor and at least one load cell, and a toilet controller comprising a communication system. In some embodiments, data output from the at least one radar sensor and data output from the at least one load cell discriminate a weight of urine from a weight of feces from a subject. In some embodiments, the controller is configured to receive the data output from the at least one radar and load cell and to transmit the data to an external device.

In some embodiments, the at least one load cell comprises a strain gauge. In some embodiments, the at least one load cell comprises two or more load cells positioned on an underside surface of the toilet seat apparatus.

In some embodiments, the at toilet seat apparatus comprises a bifurcated toilet seat comprising an upper seat layer and a lower seat layer. In some embodiments, the at least one load cell is positioned on the underside surface of the upper seat later of the toilet apparatus.

In some embodiments, the at least one radar sensor comprises a focusing lens. Among other uses, the focusing lens can be used to narrow the half-power beam of the radar, thereby enabling the radar to detect stool falling without interference from the subject's body. It also increases the signal gain and provides a stronger signal. In some embodiments, the at least one radar sensor comprises two radar sensors, with a first radar sensor positioned horizontally to detect surface area of the feces from the subject, and with a second sensor positioned at a downward angle to detect velocity of the feces.

In some embodiments, the system further comprises one or more supplemental sensors. In some embodiments, the one or more supplemental sensors is selected from a group consisting of an ultrasound sensor, a laser sensor, an RGB light sensor, a spectrophotometer, a camera, a gas sensor, an acoustic sensor, and any combinations thereof.

In some embodiments, the toilet apparatus seat comprises at least one acoustic sensor positioned on an underside surface of the toilet seat apparatus. In some embodiments, the system comprises two or more acoustic sensors. In some embodiments, a first acoustic sensor is positioned on an underside surface of the toilet seat apparatus, and a second acoustic sensor is positioned on a toilet bowl surface outside of the toilet bowl.

In some embodiments, the system further comprises a foot mat. In some embodiments, the foot mat comprises a plurality of load sensors configured to measure the weight of the subject, and the load sensors are in electronic communication with the toilet controller.

In some embodiments, the toilet controller is integrated into the toilet seat. In some embodiments, the toilet controller is separate from the toilet seat. In some embodiments, the toilet controller comprises a wireless network. In some embodiments, the system further comprises a flushing controller in electronic communication with the toilet controller. In some embodiments, the system further comprises a sensor configured to read a subject identification device.

Referring in more detail to exemplary embodiments, FIGS. 1A-1B, include a representative toilet seat apparatus 100 for use in the toilet systems of the present disclosure. The toilet seat apparatus 100 includes a seating surface 110 and hinges 120. The toilet seat apparatus 100 includes several types of sensors, generally designated 200, which are disposed on a surface of the underside of the seat. At least a portion of the sensors are configured to operate when the seat is in the upright position, as shown in FIG. 1B. The toilet system includes a control system 300, which can be housed in toilet seat apparatus 100 or provided as a separate unit. In the example embodiment shown in FIGS. 1A-1B, the sensors 200 can include at least one radar sensor and at least one load cell (e.g., strain gauge or load sensor) among the sensors on the toilet seat apparatus 100 (e.g., 207). In some embodiments, the toilet seat apparatus 100 can also include a sensor configured to distinguish urination and defecation events by measuring the patterns of water waves in the toilet bowl (see, e.g., FIG. 19). However, these types of sensors alone were found to be insufficient to accurately determine urination/defecation events because, somewhat unexpectedly, as a subject's waste falls into the toilet, water levels can actually decrease as opposed to increase. For example, changes in water patterns may not simply involve increases in water level as subject waste falls into the toilet, as real-world testing surprisingly shows that events can lead to decreases in water level (see, e.g., FIG. 19).

In some embodiments, certain sensors can be used in conjunction with other sensors in such a manner as to enhance the information collected. For example, as described further herein, the combination of a radar sensor and a load sensor can be used in the toilet seat apparatus 100 of the present disclosure to more accurately characterize urination/defecation events. Additionally, other supplemental sensors can be further added to the toilet seat apparatus 100 of the present disclosure to further enhance the information obtained. Sensors 200 can also include several other types of sensors that can be used individually or in combination. These can include, for example, acoustic, light, spectrophotometer, ultrasound, color, gas, motion, radar, force or strain measurement devices, cameras, lasers, haptic devices, and the like. Other suitable types of sensors may also be used, as would be recognized by one of ordinary skill in the art based on the present disclosure.

FIG. 2 depicts an embodiment of toilet seat apparatus 100 that uses force-measurement load sensors among the sensors 200. Load sensors integrated into the toilet seat can be used to measure the weight distribution of the user on the toilet seat. The weight distribution of the user over time while seated on the toilet seat can be used to determine if the user defecated or urinated. For example, large side-to-side movements indicate that a user is wiping with toilet paper in such a way that the user likely just experienced a bowel movement.

In the example embodiment of FIG. 2, load sensors 201 and 202 are positioned on opposite sides of the underside of seat apparatus 100. Load sensor 201 measures the weight of the user on one side of the toilet seat, and load sensor 202 measures the weight of the user on the other side of the toilet seat. The load sensors are in electrical connection with control system 300, which in this embodiment is also mounted on toilet seat apparatus 100. Control system 300 includes control circuits 301 and 302. These circuits measure the voltage change caused by load sensors 201 and 202, respectively. Control circuits 301 and 302 can be, for example, a Wheatstone bridge, a potentiometer, or any other circuit suitable for interpreting load signals. The load sensors or cells can be used to provide the weight of the user, and in particular the load cells can be used to calculate the change in user weight before and after eliminating. Additionally, the load cell data can be used to identify a user by comparing the measured weight to a previously recorded weight, and/or, by distinguishing users according to their seated posture (e.g., obtained by taking the ratio of footrest to toilet seat weights).

Although the example embodiments disclose acoustic and force-measurement sensors, it is to be understood that other types of sensors can also be incorporated into the toilet systems and apparatuses disclosed herein. For example, the system can include a light and/or color sensor that records the color of the toilet bowl. This can be useful for detecting blood in urine or stool. A camera can also be used to provide data for automated image analysis. The camera can also be used to detect blood in stool or urine, as well as sedimentation levels of urine, color and consistency of stool, and the like. Camera images can further be transmitted to an external device as a visual record for physician review. The toilet systems and apparatuses may additionally or alternately be fitted with a gas sensor, which measures levels of gasses released during defecation, such as hydrogen, methane, $CO_2$, volatile organic compounds, and the like. This information can be used to detect select bacterial infections with a characteristic smell (e.g., *Clostridium difficile*). Each of these sensors can be disposed in a region of the underside of toilet seat apparatus 100 (e.g., facing towards the toilet bowl) and in electronic communication with control system 300.

In some embodiments, control system 300 comprises computing hardware and software, including a processor, memory, software, and/or electronic/network communications features. In the example embodiment of FIG. 2, control system 300 receives load cell data and transmits a signal to external devices and/or systems. These external systems include any system that can be used for user monitoring or treatment, safety, efficiency, and the like, such as a flush control system, nurse monitoring stations, clinical test recorders, electronic medical records (EMR), Electronic Health Records (EHR), and the like. In some embodiments, control system 300 is capable of analyzing or modifying the received data and can provide instructions to the external systems. Data sent to EHR includes, but is not limited to, subject identity, weight, height, gender, disease indications, medications being taken, and urine/stool characteristics (e.g., mass, length of time, time of day), as well as any other clinically relevant data/information.

Control system 300 can optionally include an internal power supply 305 for independently powering the toilet system without the need for external power. Power supply 305 can be, for example, a non-replaceable and/or rechargeable battery. In the example embodiments shown in FIGS. 2 and 3, control system 300 is shown as integrated into toilet seat 100. However, controller 300 can also be a separate unit (see, e.g., FIG. 10). The separate unit can be mounted on a wall in proximity to the toilet system. By configuring controller 300 as a separate unit, the unit can provide increased functionality over an integrated control system 300. For example, a separate unit can include a larger battery 305. Additionally, in other non-limiting examples, controller 300 can include a call button, a visual display screen, an interactive touchscreen for data input by the user, a camera, and/or a voice communication system.

In some embodiments, controller 300 can also be used to operate the toilet system as a bathroom scale and measure static user weights. Other forms of user feedback (e.g., whether the user is stable enough for accurate weight measurements) can be communicated through the controller 300 and/or the toilet seat/foot mat via haptic, indicator light, or audio signals. The controller can also house sensors to detect a patient-wearable identification device (e.g., an RFID band). Other features are also possible and will be evident to those of ordinary skill in the art based on the present disclosure.

Figures 9A, 9B, 9C, 9D:
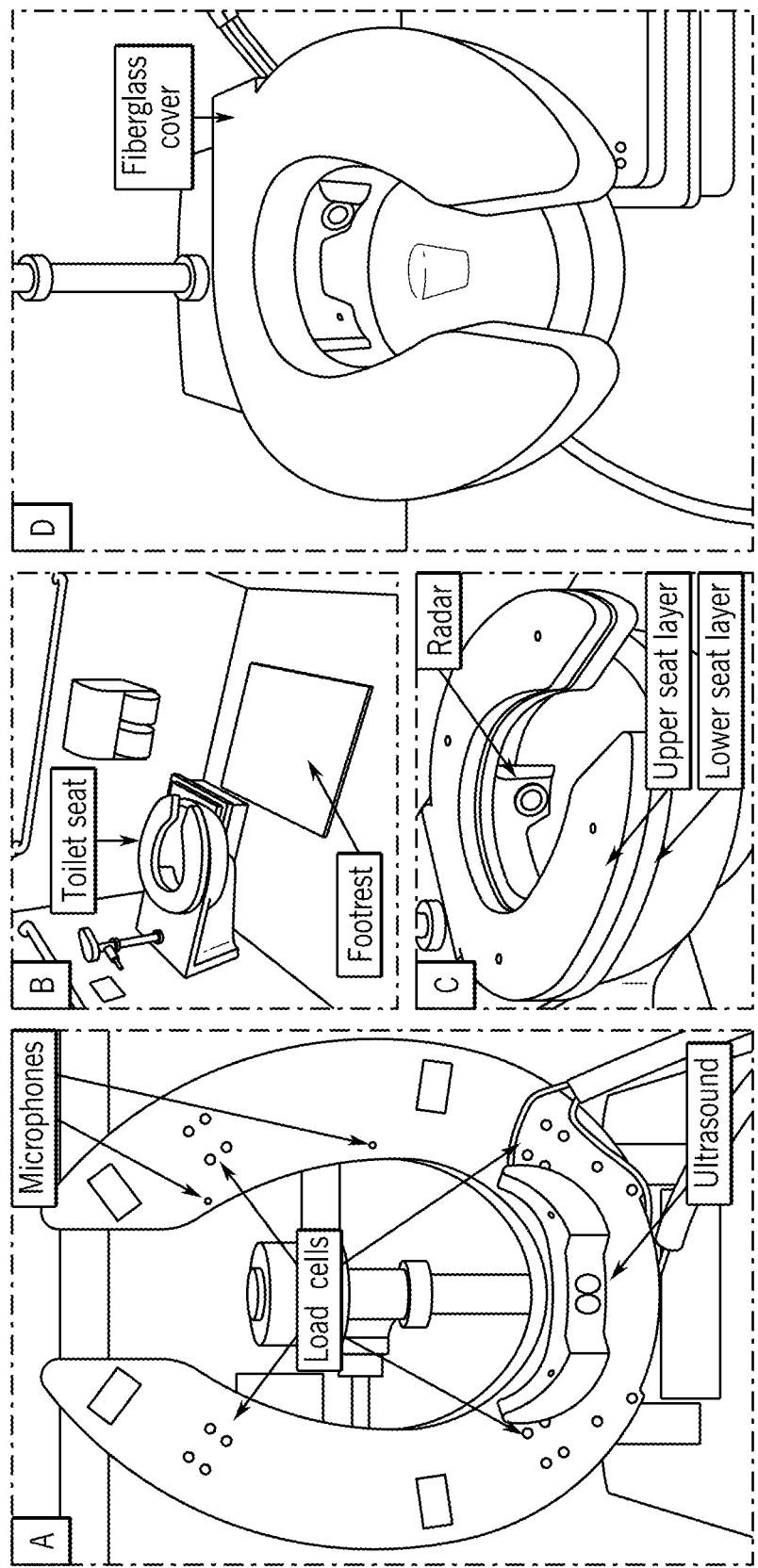
FIGS. 9A-9D.

In some embodiments, such as those represented by FIGS. 9 and 10, the toilet seat apparatus 100 of the present disclosure includes a bifurcated seat configuration (FIG. 10). In this embodiment, the bifurcated into an upper and lower layer. Additionally, load cells are placed between these layers, and hinges are attached to the lower layer. The load cells can more accurately determine weight differentials before and after urination/defecation events because this configuration allows the use of conventional toilet seat hinges to attach to the toilet seat and bear load without affecting weight measurements of the subject. This configuration also has the added advantage of facilitating a larger and more stable contact surface for load cells. To prevent ingress of liquid and prevent pinching, the layers can be covered by a solid outer housing.

Figure 11:
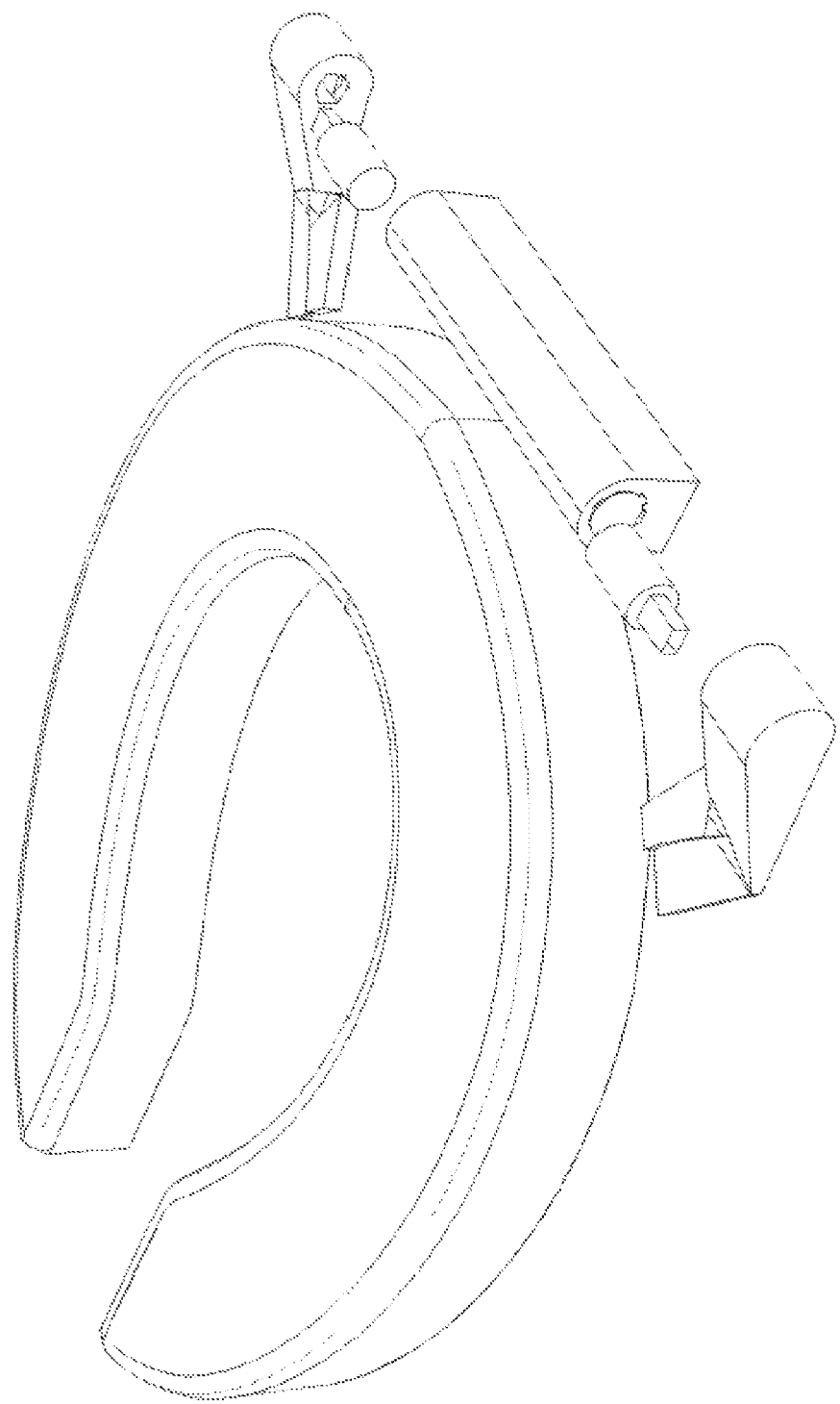
FIG. 11 is a schematic illustration of an exploded view of the hinge mechanism for a toilet seat apparatus, according to one embodiment of the present disclosure.

FIG. 11 depicts the integration of existing hinge designs into the bifurcated seat configuration of the toilet seat apparatus 100 of the present disclosure. Such hinges may include "slow-close" hinge designs, which prevent the seat from being rapidly closed and damaging the electronic components inside. This hinge mechanism connects to the bottom half of the sandwich design, as described above.

Figure 3:
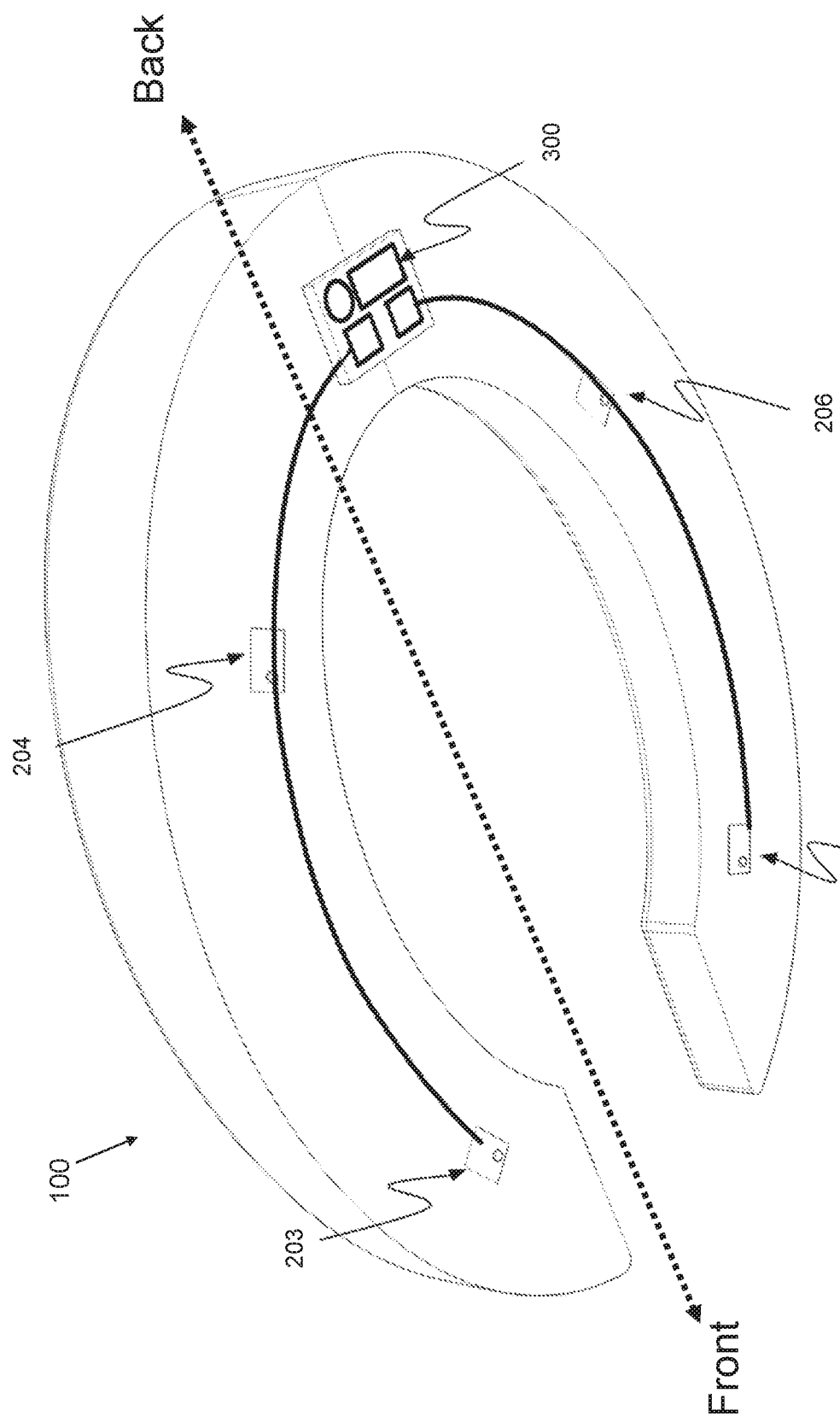
FIG. 3 is a perspective view of the toilet seat apparatus highlighting the acoustic sensors, according to one embodiment of the present disclosure.

In some embodiments, such as those represented in FIG. 3, the toilet seat apparatus 100 of the present disclosure includes acoustic sensors mounted on a surface of the underside of seat 100. Two or more acoustic sensors can be used to detect the sounds emanating from inside the toilet bowl, and acoustic localization can be used for discriminating between urination and defecation. These sensors are oriented such that one sensor is closer to the front of the toilet seat than the other. This orientation will enable acoustic signal processing routines to determine whether biological waste material is originating towards the front or back of the toilet seat, and thus facilitate discrimination of urine and stool events. Additionally or alternatively, acoustic signals in either individual or multiple sensors may be analyzed using machine learning algorithms to recognize sounds associated with urination, defecation, or other events associated with toilet use.

In the embodiment of FIG. 3, acoustic sensors 203, 204, 205, and 206 are mounted on an underside of toilet seat apparatus 100 at spaced intervals around the perimeter of the seat and are used to record the sound of urination and/or defecation. In some embodiments, control system 300 receives digital audio data. Control system 300 can then process the audio data to determine the location of the sound source. Additionally or alternatively, control system 300 can communicate the original ("raw") audio data or modified data to external devices or systems where the audio data can be processed to determine the location of the sound source.

In some embodiments, such as those represented by FIG. 7, the toilet seat apparatus 100 includes a radar sensor mounted on a surface on the underside of seat. In this design, a radar sensor can detect and analyze falling stool. In some embodiments, the toilet seat apparatus 100 includes two radar sensors. For example, a first radar sensor is positioned horizontally to detect surface area of the feces from the subject (e.g., FIG. 9C), and a second sensor is positioned at a downward angle to detect velocity of the feces (e.g., FIGS. 7A-7D). A focusing lens may be placed in front of the radar sensor to concentrate the strength of the radar beam. Among other uses, the focusing lens can be used to narrow the half-power beam of the radar, thereby enabling the radar to detect stool falling without interference from the subject's body. It also increases the signal gain and provides a stronger signal. The radar sensor may also be used to determine the material properties of stool, including its volume or water content. In these embodiments, two radar sensors are employed simultaneously to characterize the mass of expelled stool (FIG. 7C-7D). A horizontally oriented sensor measures the size of the surface area of falling stool, and a downwards-angled radar sensor measures the velocity of the stool. These measurements are then mathematically combined to estimate stool volume.

Figure 12:
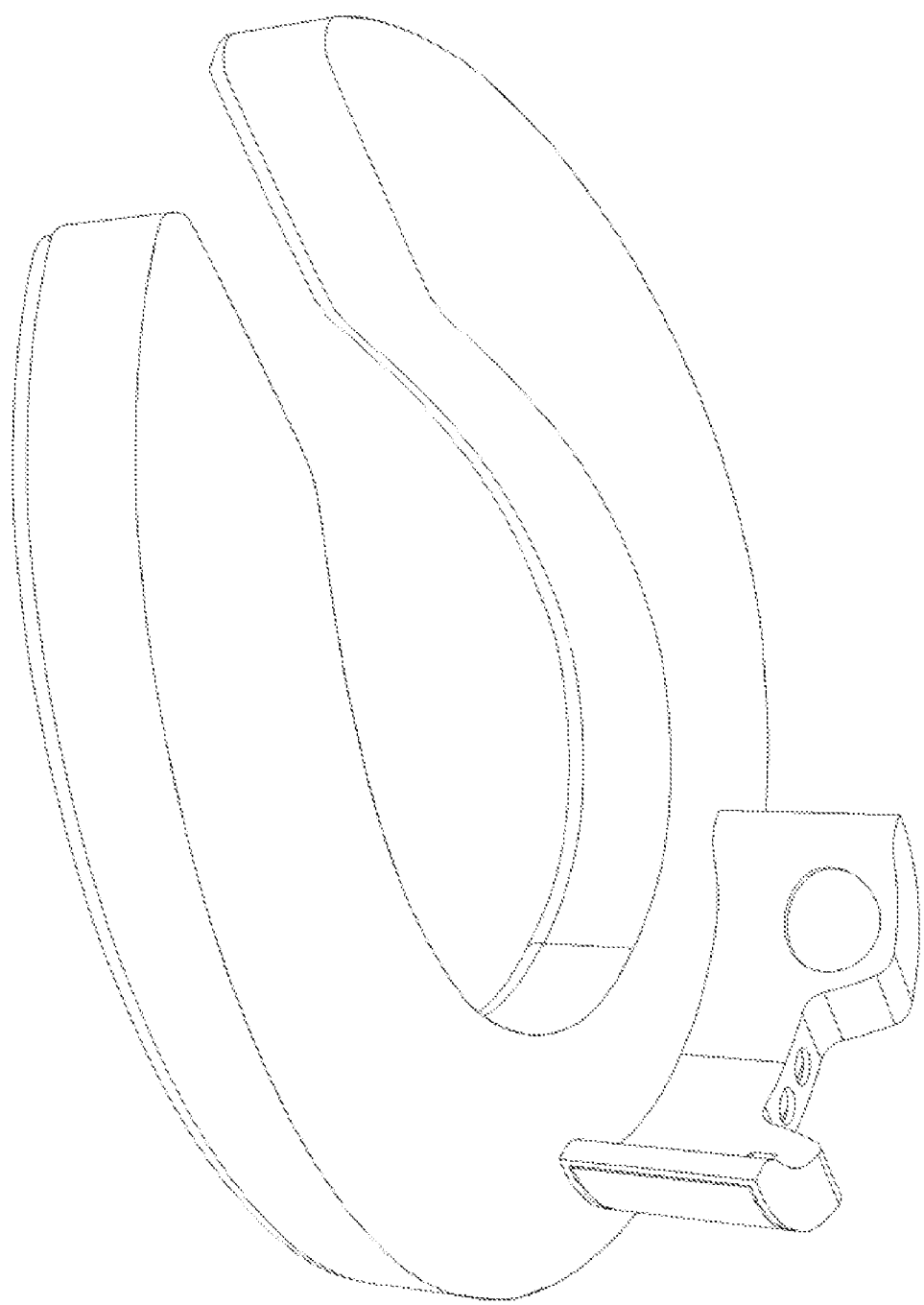
FIG. 12 is a schematic illustration of housing for sensors that can be mounted on the underside of the toilet seat apparatus to protect the sensors, according to one embodiment of the present disclosure.

In some embodiments, such as those represented by FIG. 12, the toilet seat apparatus 100 includes an optional housing for sensors that can be mounted on the underside of the toilet seat. This housing facilitates appropriate angling of sensors (e.g., FIGS. 7-9) while protecting them from water or human waste.

Figure 13:
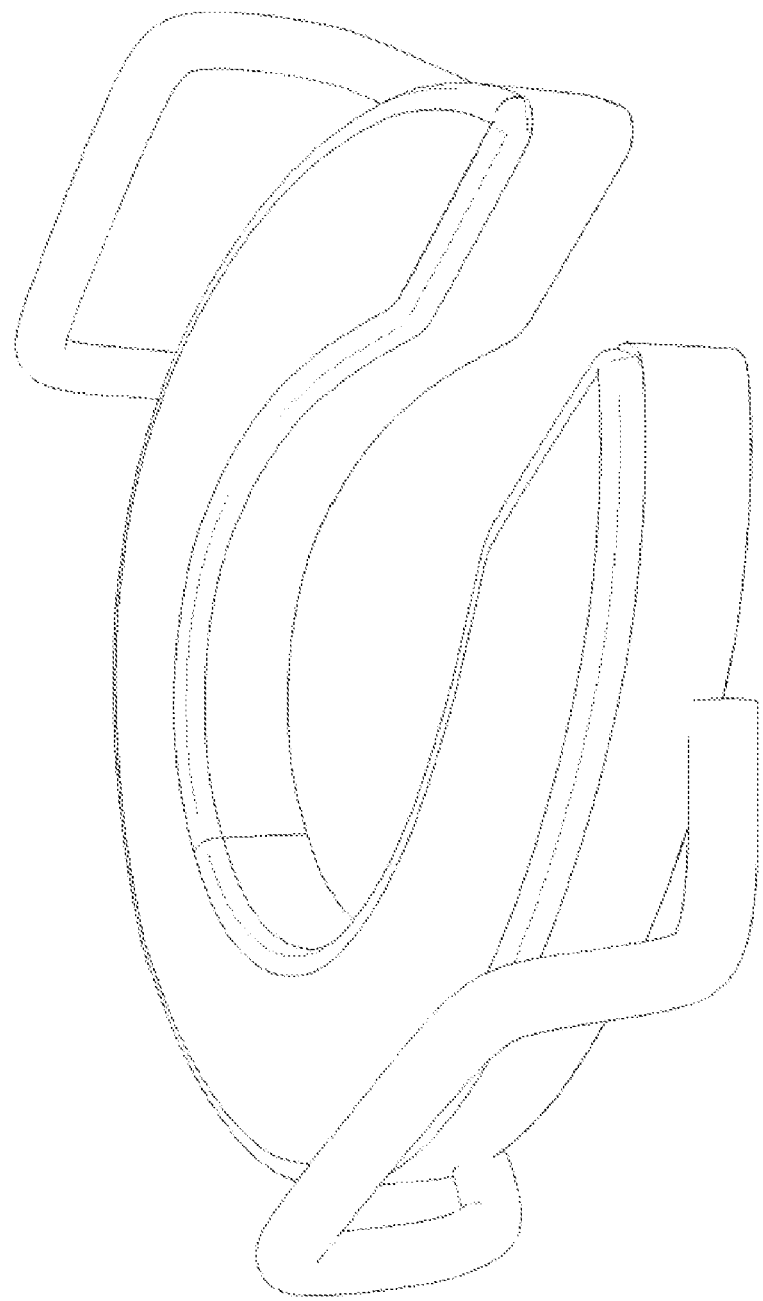
FIG. 13 is a schematic illustration of a toilet seat apparatus that includes armrests, according to one embodiment of the present disclosure.

In some embodiments, such as those represented by FIG. 13, the toilet seat apparatus 100 includes an optional set of armrests that can be connected to the toilet seat. These arms allow weak or unstable users to stabilize themselves using their arms. The armrests are fixed to the top layer of the bifurcated toilet seat design such that all loads placed on the arm rest will be borne by the top layer of the toilet seat, and the forces imparted by those loads on the arm rests will be measured by the toilet seat load cells that are in between the top layer and bottom layer of the toilet seat.

Figure 14:
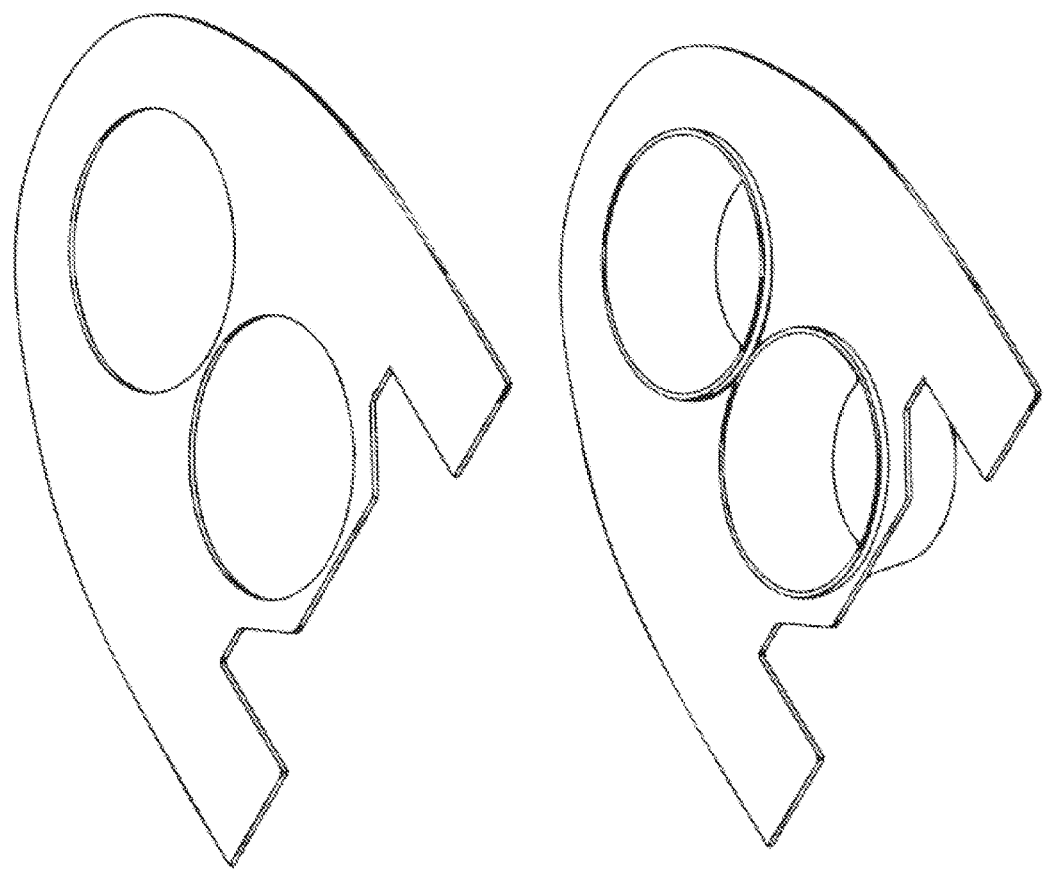
FIG. 14 is a schematic illustration of a toilet seat apparatus that includes a stool/urine collection apparatus, according to one embodiment of the present disclosure.
Figure 15:
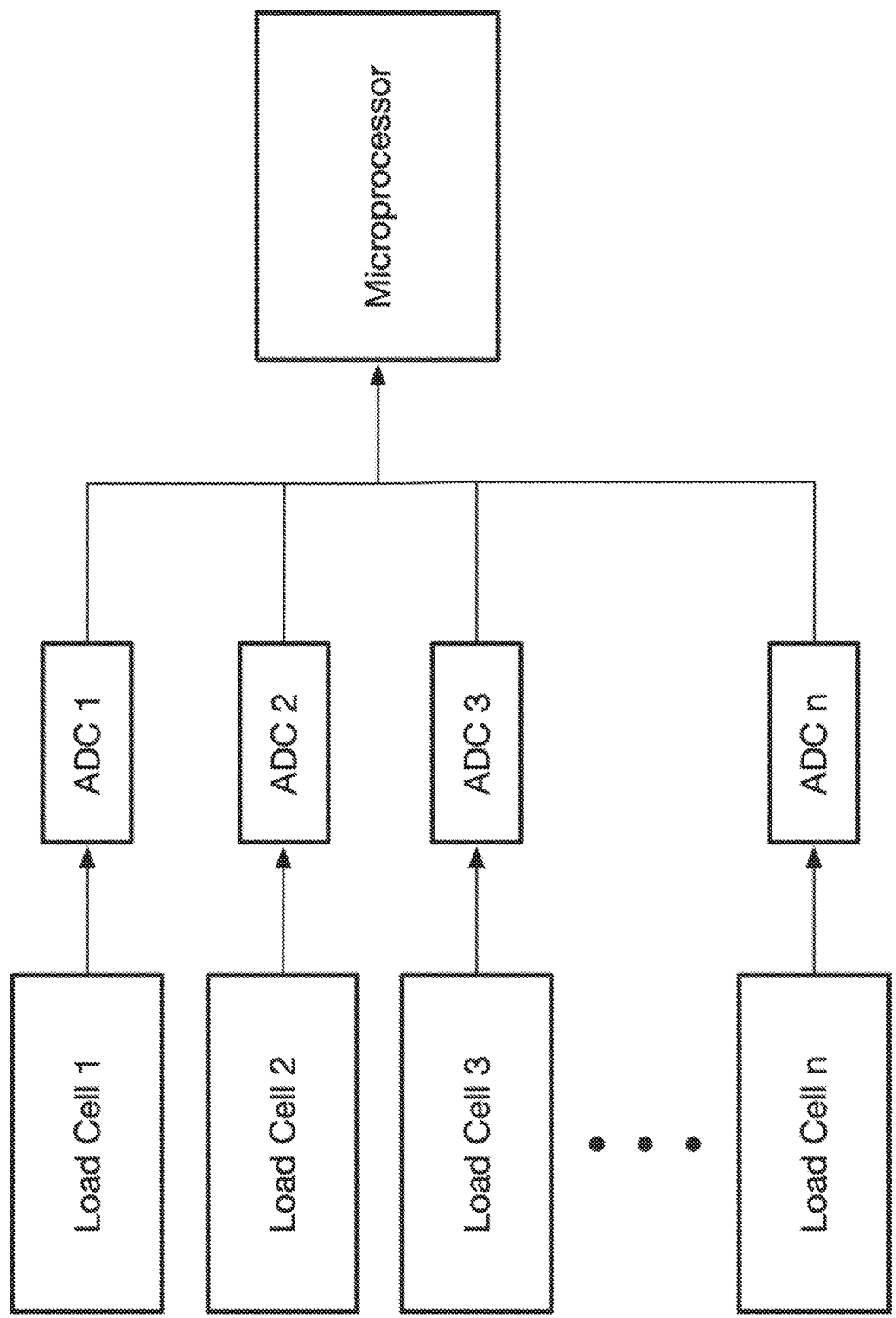
FIG. 15 is a schematic illustration of a connectivity diagram for the various components of the toilet system, according to one embodiment of the present disclosure.

In some embodiments, such as those represented by FIG. 14, the toilet seat apparatus 100 includes an optional apparatus for collecting stool and/or urine specimens while using the toilet system. This apparatus is placed between the toilet seat and the toilet bowl rim. Two cut-outs in its center can be fitted with standard specimen collection tubs.

Figure 4:
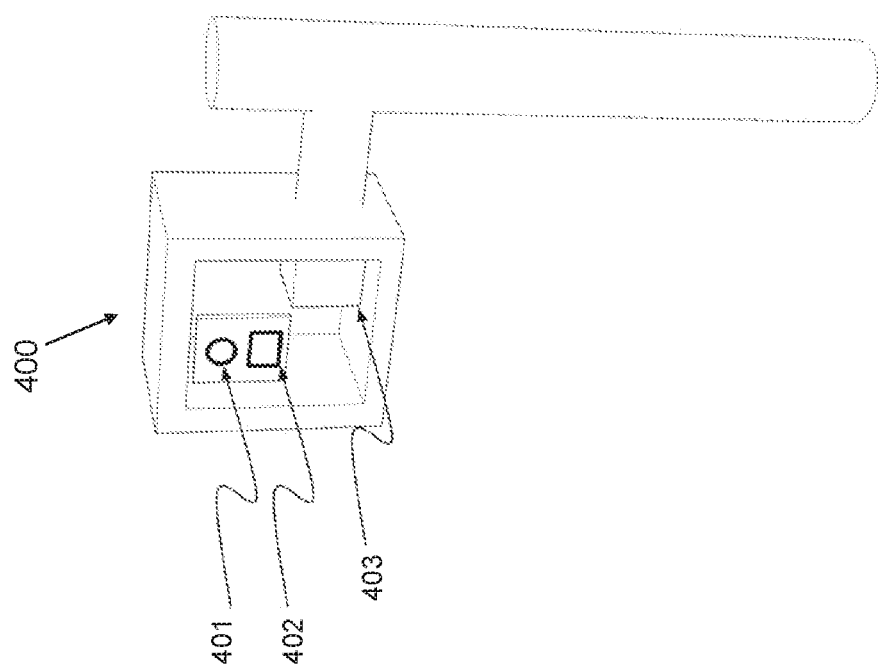
FIG. 4 is a perspective view of the toilet seat apparatus highlighting the optional flushing controller, according to one embodiment of the present disclosure.
Figure 7A:
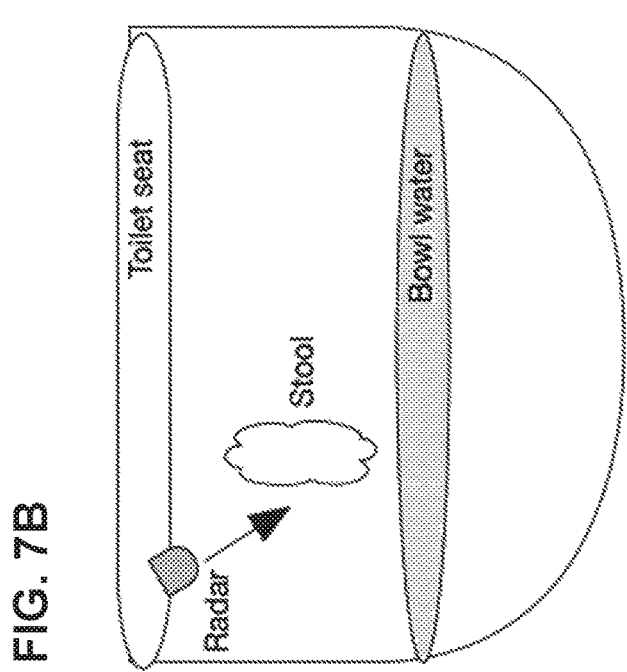
FIGS. 7A-7D.
Figure 7B:
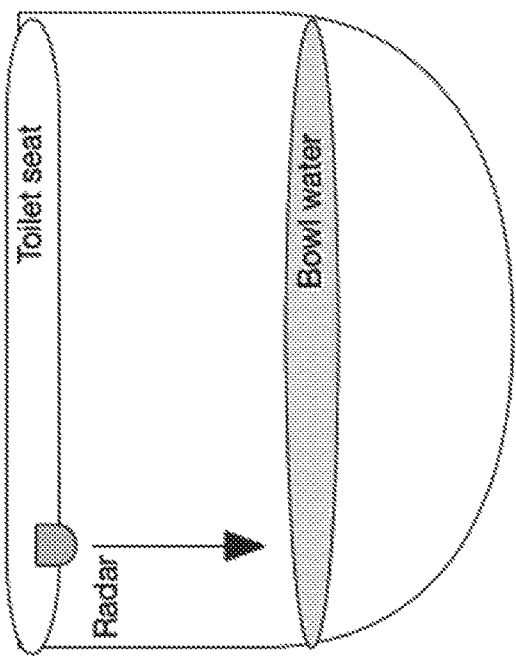
Figure 7D:
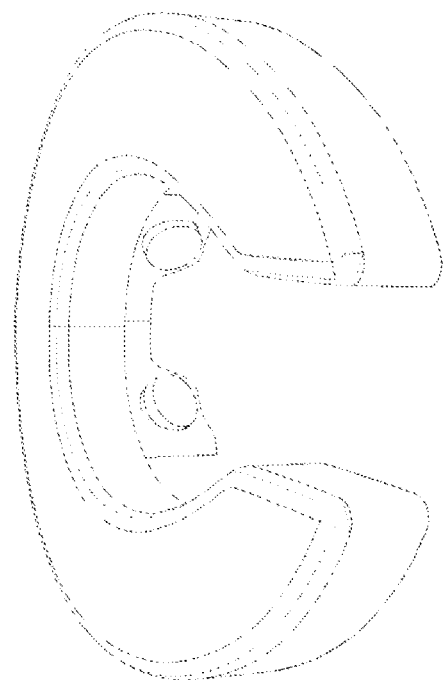
Figure 7C:
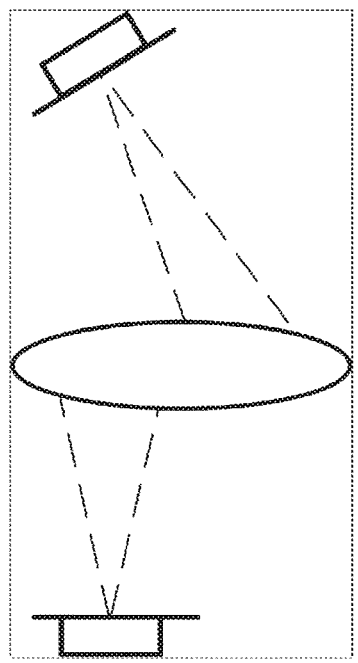

In some embodiments, such as those represented by FIG. 4, the toilet seat apparatuses and systems of the present disclosure include an optional flushing controller 400. In some embodiments, the flushing controller 400 communicates with control system 300 to obtain the information regarding the determined type of elimination. This information can promote water savings by automatic selecting the most efficient water usage. The toilet water flushing volume can be controlled in such a way that the appropriate amount of water is flushed for the type of urination/defection event that just occurred. For example, if the toilet system determines that a user has had a bowel movement, then the system will flush with a large volume of water. Otherwise, the system will flush with a smaller volume of water. In the embodiment shown in FIG. 4, a battery 401 powers the system. Controller 402 receives communications from the toilet seat control system 300, and actuator 403 determines the volume of water that flows into the toilet.

As described further herein, the toilet seat apparatuses and systems of the present disclosure include hinge mechanisms that provide additional enhancements to the toilet systems. For example, FIG. 5 depicts multiple views of a toilet seat hinge 120. The elongated height of hinge 120 removes vertical constraints on the seat in the hinge area, allowing toilet seat 100 to rest on the rim of the toilet base without upward or downward pressure on the hinge. Additionally, this elongation allows the hinge knuckles to be rotated and inserted into the hinge for assembly. In particular, hinge 120 can be used in conjunction with load cells (e.g., 201, 202), resulting in more accurate load measurements.

In some embodiments, such as those represented by FIG. 6, the toilet seat apparatuses and systems of the present disclosure include foot mat 500 that interacts with the toilet seat apparatus 100. For example, as shown in FIG. 6, the subject's data collection is shared by the toilet seat apparatus 100 and the foot mat 500. In some embodiments, the foot mat's edges may be beveled (e.g., to comply with standards set by the Americans with Disabilities Act). In some embodiments, the foot mat 500 includes load sensors (also known as "load cells") that are also in electrical communication with control system 300. The foot mat load sensors are used to measure the weight of a user. The foot mat can also optionally be equipped with additional sensors, such as standing water sensors (which could turn off the device in case of flooding) and/or user proximity sensors.

Figure 17:
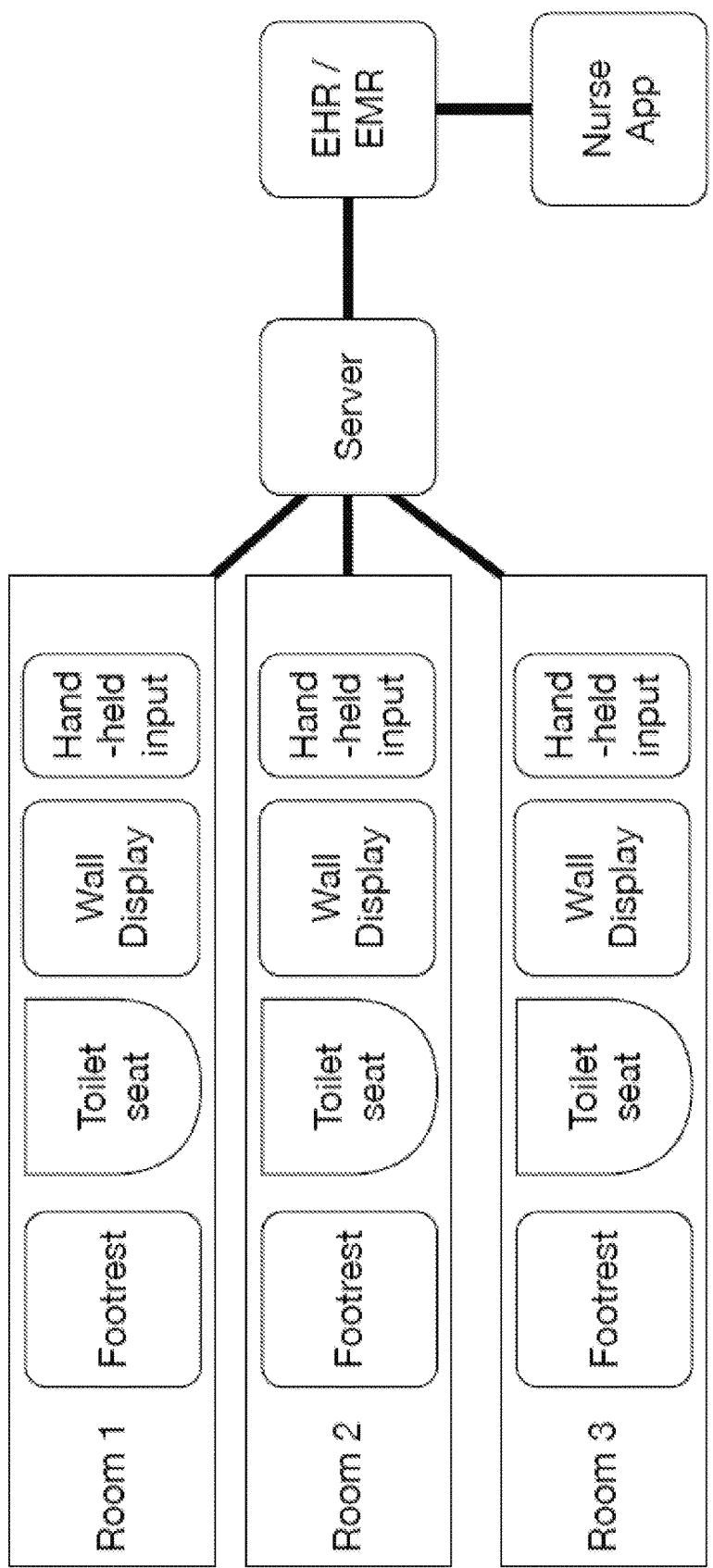
FIG. 17 is a schematic illustration of a multi-room toilet system, according to one embodiment of the present disclosure.

In accordance with the above embodiments, the various components of the toilet systems of the present disclosure are in electrical communication with each other in order to facilitate accurate measurement of urination/defecation events from a subject, as well as to enable the effective processing of that output data in a manner that informs medical professionals about the subject's condition. For example, as shown in FIG. 17 depicts one potential wiring diagram for load cells in the toilet system. Load cells may each be connected to individual analog to digital converters (ADC), which in turn communicate with the control system 300. This configuration will facilitate more accurate device weighing capabilities, by allowing individual load cells to be tuned or matched according to their physical capabilities.

In some embodiments, a single-room can be configured with a toilet system of the present disclosure, such that it operates autonomously (FIG. 16). Additionally embodiments of the present disclosure include multiple toilet systems that can be connected in a centralized manner (FIG. 17). For example, each bathroom can be equipped with a foot mat and toilet seat apparatus. In some embodiments, a hand-held input device (e.g., touchscreen tablet, or a physical button-based interface) can also be connected to the toilet system in each room for manual user data input (e.g., recording of urination or defecation events). Sensor data from each room are uploaded and analyzed on a central server. Processed data, in turn, are uploaded to electronic health or medical records (EHR/EMR), which in turn could be made available through an app on a nurse phone or touchscreen device. These data may also be made visible in the bathroom via a wall-mounted display.

The control systems described herein (e.g., 300, 400) can be implemented in hardware, software, firmware, or combinations of hardware, software and/or firmware. In some examples, the control systems described in this specification may be implemented using a non-transitory computer readable medium storing computer executable instructions that when executed by one or more processors of a computer cause the computer to perform operations. Computer readable media suitable for implementing the control systems described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a control system described in this specification may be located on a single device or computing platform or may be distributed across multiple devices or computing platforms.

3. Methods of Use

Embodiments of the present disclosure also include a method of determining a stool and/or urine event from a subject using the any of the toilet systems described above. In accordance with these embodiments, the method includes detecting a subject's presence, initiating data collection using the toilet controller, and collecting elimination event data using the sensors in the toilet seat apparatus. In some embodiments, the method further comprises analyzing the elimination event data using the toilet controller and/or transmitting the elimination data to an external device for analysis. In some embodiments, the method further comprises executing an action dependent on the type of elimination event, wherein the action comprises signaling a flushing controller, signaling a remote operator, and/or saving the elimination data to an electronic record.

Figure 18:
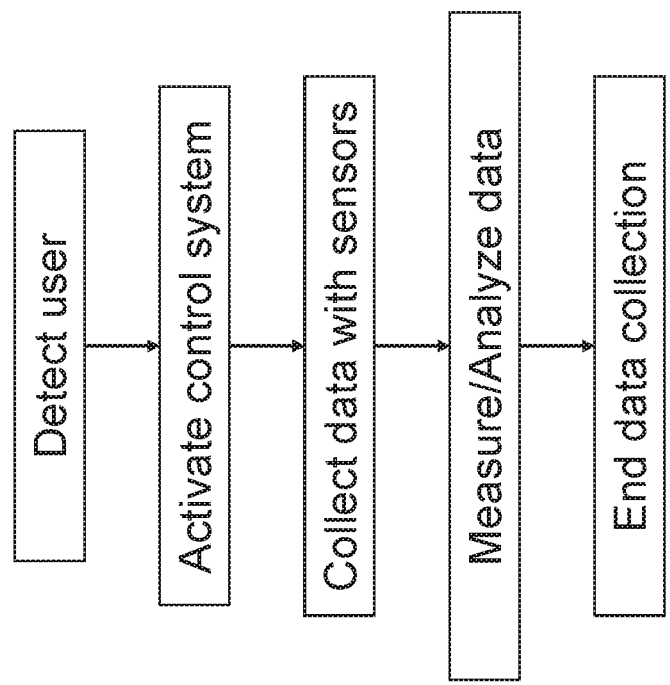
FIG. 18 is a flowchart with an example method of using a toilet system, according to one embodiment of the present disclosure.

In some embodiments, such as those represented in FIG. 18, an exemplary method of using the disclosed toilet system includes the toilet system first detecting a subject. This can be accomplished, for example, with a proximity sensor located in a wall module controller (e.g., 300) or in the toilet seat, or with a load sensor in a foot mat or in the toilet seat. The detection of a user "wakes" the controllers from a sleep mode, if necessary, and initiates data collection from the sensors. The installed sensors 200 communicate with the control system 300 to transmit and store the collected data. The data is analyzed by the computing system associated with control system 300 (either internally or externally), and a prescribed action is taken depending on the results of the analysis. This analysis may be carried out by machine learning-based algorithm; or, one that is manually designed and curated. Data collection ends when the toilet system either detects no further sensor action or when the proximity sensor detects the departure of the user.

In some embodiments, distance, radar, and/or audio sensors are used to measure water level changes, the presence of falling stool, and the sound of urination and defecation events in the toilet with respect to time. The use of a combination of sensors can provide more accurate results than any single sensor alone, which enhances the overall efficacy of the toilet systems and apparatuses of the present disclosure, as compared to more conventional systems. In some embodiments, an algorithm determines the timing of events that include defecation and/or urination. Simultaneously, the toilet system can collect additional data using other sensors, such as user weight, via load sensors in the seat or foot mat. This information is then transmitted to one or more external devices according to predefined instructions. These data are ultimately combined to calculate the mass of expelled urine and stool from a user.

Figure 19:
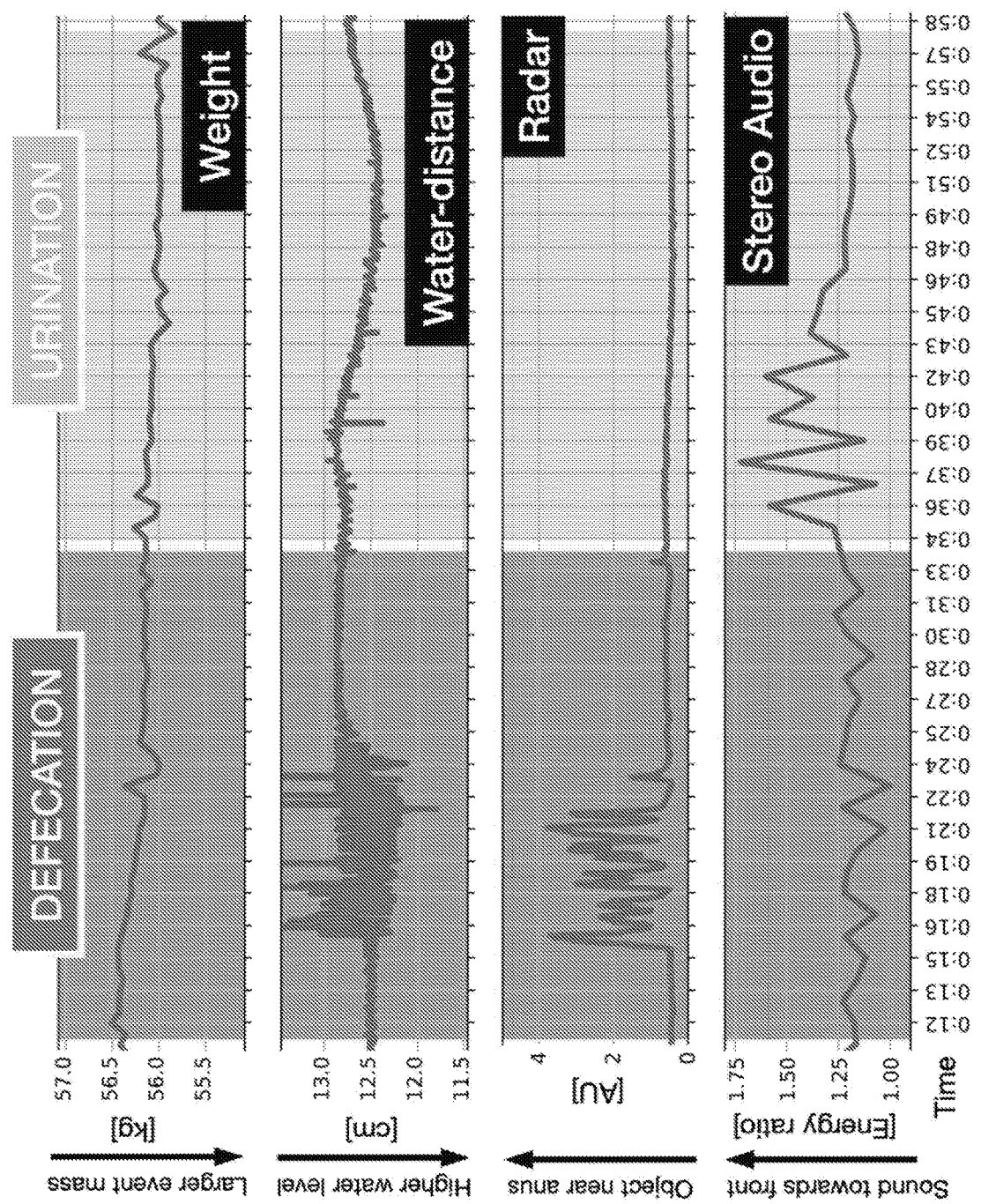
FIG. 19 includes representative data obtained from the various sensors of the toilet system, according to one embodiment of the present disclosure.

For example, FIG. 19 includes characteristic real-world sensor data across toilet use. Red areas indicate defecation; yellow indicate urination. Distances from toilet seat to water surface are measured via ultrasound; shorter distances indicate higher water levels. Note that during this use case, defecation may unexpectedly lead to decreases in water level. A radar sensor is positioned near the anus and only detects falling stool. Two microphones are placed under the seat; higher ratios of audio energy from the front microphone, relative to the rear one, indicate waste streams striking surfaces near the front of the toilet seat.

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

What is claimed is:

1. A toilet system, comprising:
a toilet seat apparatus comprising at least one radar sensor and at least one load cell,
wherein the at least one radar sensor comprises a focusing lens; and
a toilet controller comprising a communication system;
wherein data output from the at least one radar sensor and data output from the at least one load cell discriminate a weight of urine from a weight of feces from a subject, and wherein the controller is configured to receive the data output from the at least one radar sensor and load cell and to transmit the data to an external device.

2. The system according to claim 1, wherein the at least one load cell comprises a strain gauge.

3. The system according to claim 1, wherein the at least one load cell comprises two or more load cells positioned on an underside surface of the toilet seat apparatus.

4. The system according to claim 1, wherein the at toilet seat apparatus comprises a bifurcated toilet seat comprising an upper seat layer and a lower seat layer.

5. The system according to claim 1, wherein the at least one load cell is positioned between the upper and lower layers of the bifurcated toilet seat.

6. The system according to claim 1, wherein the at least one radar sensor comprises two radar sensors, wherein a first radar sensor is positioned horizontally to detect surface area of the feces from the subject, and a second sensor is positioned at a downward angle to detect velocity of the feces.

7. The system according to claim 1, further comprising one or more supplemental sensors.

8. The system according to claim 7, wherein the one or more supplemental sensors is selected from a group consisting of an ultrasound sensor, a laser sensor, an RGB light sensor, a spectrophotometer, a camera, a gas sensor, an acoustic sensor, and combinations thereof.

9. The system according to claim 1, wherein the toilet apparatus seat comprises at least one acoustic sensor positioned on an underside surface of the toilet seat apparatus.

10. The system according to claim 1, wherein the system comprises two or more acoustic sensors, wherein a first acoustic sensor is positioned on an underside surface of the toilet seat apparatus, and wherein a second acoustic sensor is positioned on a toilet bowl surface outside of the toilet bowl.

11. The system according to claim 1, further comprising a foot mat, wherein the foot mat comprises a plurality of load sensors configured to measure the weight of the subject, and wherein the load sensors are in electronic communication with the toilet controller.

12. The system according to claim 1, wherein the toilet controller is integrated into the toilet seat.

13. The system according to claim 1, wherein the toilet controller is separate from the toilet seat.

14. The system according to claim 1, wherein the toilet controller comprises a wireless network communication system.

15. The system according to claim 1, further comprising a flushing controller in electronic communication with the toilet controller.

16. The system according to claim 1, further comprising a sensor configured to read a subject identification device.

17. A method of determining a stool and/or urine event from a subject using the toilet systems of claim 1, the method comprising:
detecting a subject's presence;
initiating data collection using the toilet controller; and
collecting elimination event data using the sensors in the toilet seat apparatus.

18. The method according to claim 17, further comprising analyzing the elimination event data using the toilet controller and/or transmitting the elimination data to an external device for analysis.

19. The method according to claim 17, further comprising executing an action dependent on the type of elimination event, wherein the action comprises signaling a flushing controller, signaling a remote operator, and/or saving the elimination data to an electronic record.

* * * * *